(12) United States Patent
Martins Rodrigues et al.

(10) Patent No.: US 11,313,307 B2
(45) Date of Patent: Apr. 26, 2022

(54) METHOD AND DEVICE FOR EVALUATING THE COMPRESSION OF THE CYLINDERS OF AN INTERNAL COMBUSTION ENGINE

(71) Applicant: STRA, S.A., Coimbra (PT)

(72) Inventors: Humberto Jorge Martins Rodrigues, Coimbra (PT); Roney Camargo Malaguti, Coimbra (PT); Nuno André Dos Santos Silva, Coimbra (PT)

(73) Assignee: STRA, S.A., Coimbra (PT)

(*) Notice: Subject to any disclaimer, the term of this patent is extended or adjusted under 35 U.S.C. 154(b) by 0 days.

(21) Appl. No.: 17/253,562

(22) PCT Filed: Jun. 18, 2019

(86) PCT No.: PCT/IB2019/055109
§ 371 (c)(1),
(2) Date: Dec. 17, 2020

(87) PCT Pub. No.: WO2019/244038
PCT Pub. Date: Dec. 26, 2019

(65) Prior Publication Data
US 2021/0270201 A1 Sep. 2, 2021

(30) Foreign Application Priority Data
Jun. 18, 2018 (PT) .......................... 110790

(51) Int. Cl.
*F02D 41/22* (2006.01)
*B60R 16/023* (2006.01)
(Continued)

(52) U.S. Cl.
CPC ............ *F02D 41/22* (2013.01); *B60R 16/023* (2013.01); *F02N 11/0862* (2013.01);
(Continued)

(58) Field of Classification Search
CPC ............... F02D 41/22; F02D 2200/024; F02D 2200/50; B60R 16/023; G01M 15/08; F02N 11/0862; F02N 2200/063
(Continued)

(56) References Cited

U.S. PATENT DOCUMENTS 4,050,296 A  9/1977 Benedict
4,126,037 A  11/1978 Hanson et al.
(Continued)

FOREIGN PATENT DOCUMENTS

GB  1576229 A  10/1980

*Primary Examiner* — Hai H Huynh
(74) *Attorney, Agent, or Firm* — Leason Ellis LLP

(57) ABSTRACT

A method for evaluating the compression of the cylinders of an internal combustion engine of a vehicle having an electric starter motor and a respective starting battery, comprising: start capturing the battery voltage signal when the starter motor stars to rotate the internal-combustion engine so as to initiate operation of the engine under its own power; cease capturing the battery voltage signal when the engine enters operation under its own power; process the captured voltage signal for the location of local minimums; calculate the time difference between consecutive local minimums; detect if there is a variation of time between the calculated differences higher than a predetermined threshold between any said calculated time differences; and, if there is such variation, signal a potential engine malfunction. Also provided is a device for accomplishing the foregoing.

14 Claims, 2 Drawing Sheets

(51) Int. Cl.
*F02N 11/08* (2006.01)
*G01M 15/08* (2006.01)

(52) U.S. Cl.
CPC ....... *G01M 15/08* (2013.01); *F02D 2200/024* (2013.01); *F02D 2200/50* (2013.01); *F02N 2200/063* (2013.01)

(58) Field of Classification Search
USPC .................. 123/179.3, 179.4; 701/112–113; 73/114.58, 114.59
See application file for complete search history.

(56) References Cited

U.S. PATENT DOCUMENTS

| | | | |
|---|---|---|---|
| 4,791,808 A | 12/1988 | Lackner et al. | |
| 6,091,325 A * | 7/2000 | Zur | H02J 7/14 |
| | | | 340/455 |
| 7,173,397 B2 * | 2/2007 | Kinoshita | H02J 7/14 |
| | | | 320/134 |
| 2020/0197983 A1 * | 6/2020 | Alexander | B08B 3/026 |

* cited by examiner

METHOD AND DEVICE FOR EVALUATING THE COMPRESSION OF THE CYLINDERS OF AN INTERNAL COMBUSTION ENGINE

CROSS-REFERENCE TO RELATED APPLICATIONS

This application is a U.S. National Stage Application under 35 U.S.C. § 371 of International Patent Application No. PCT/IB2019/055109, filed Jun. 18, 2019, which claims priority to Portugal Patent Application No. 110790, filed Jun. 18, 2018, the contents of which are each hereby incorporated by reference in their respective entireties.

TECHNICAL FIELD

The present disclosure relates to a method and device for evaluating the compression of the cylinders of an internal combustion engine.

BACKGROUND

The compression ratio is a physical-mathematical element that is present in all the internal combustion engines. In all these engines compression ratio plays a key role in their performance. In general, the higher the compression ratio, the higher the thermodynamic efficiency of internal combustion engines—however, the compression has limits, either by the constitution of the engine, by the limit to the detonation/pre-ignition of the fuel, or by the pressure and temperature limit supported by the engine in question.

By testing the compression of each cylinder in the engine valuable information can be gathered to diagnose severe problems in the vehicle and to measure and improve engine performance.

Compression tests are complicated tests, as they need to be done by specialized technicians and involve the immobilization (forced downtime) of the vehicle. Additionally, the engine must be put in special testing conditions:

The engine must be stationary;
Engine temperature should be above 75° C.;
Activated handbrake;
No gear changes;
Fully charged battery;
The compressed air system must be ready for operation after startup phase;
The engine must be disabled from starting by commanding its ECU to disable fuel injection and ignition.

Complete compression tests also involve disassembling the engine to install pressure sensors in the place of injectors or spark plugs.

These facts are disclosed in order to illustrate the technical problem addressed by the present disclosure.

General Description

The present disclosure discloses a method for evaluating the compression of the cylinders during the normal start of the engine. An aspect of the present disclosure relates to be non-intrusive and it does not need the intervention of specialized technicians, does not require the engine to be the disassembled and does not need to put the engine in special testing conditions that stress the starter motor. The method can be completely automatic, and the vehicle user does not have to realize that the test is being performed, because there is no change in the normal engine startup. Using a high rate data acquisition system, the disclosed method monitors the battery voltage and its variations with the higher torque demand in the starter motor during each cylinder's compression. Higher compression will cause higher effort on the starter, which draws higher current and in the last instance will cause a lower battery voltage.

In an embodiment for better results, it may be necessary to know the number of cylinders on the engine being monitored to identify the minimum quantity of top dead centre (TDC) points.

This analysis is preferably limited to the cranking phase in engines that need to rotate, at least, two crankshaft revolutions (one engine cycle). This requirement is such that all the cylinders pass through the compression cycle (stroke). The analysis is made by comparing all the cylinders of the engine, if all of them have similar wear, nothing will be noticed.

In the compression cycle (stroke) of an internal combustion engine, when a piston goes from the bottom dead centre (BDC) to the TDC, the pressure inside the cylinder will increase. When a piston reaches the TDC, the highest-pressure point is achieved. To outgrow this pressure's increase, the starter motor will draw more current from the vehicle's battery. Because of the battery's internal resistance, a higher current will cause a drop in the battery voltage. Due to this, the vehicle's battery voltage will oscillate during the cranking phase according to the engine's cylinder number and it's state of health. The battery voltage plot in the cranking phase can be segmented at the compression area of the various engine's cylinders.

It is disclosed a method for evaluating the compression of the cylinders of an internal-combustion engine of a vehicle having an electric starter motor and respective starting battery, comprising:

start capturing the battery voltage signal when the starter motor stars to rotate the internal-combustion engine so as to initiate operation of the engine under its own power;
cease capturing the battery voltage signal when the engine enters operation under its own power;
process the captured voltage signal for the location of local minimums; calculate the time difference between consecutive local minimums;
detect if there is a variation of time between the calculated differences higher than a predetermined threshold between any said calculated time differences;
if there is such variation, signal a potential engine malfunction.

In an embodiment, the predetermined threshold is 10% and the method comprises detecting if there is a variation of time between the calculated differences higher than 10% between any said calculated time differences.

An embodiment:
detecting if there is a variation of time between the calculated differences higher than 10% between: any said calculated time difference other than the first calculated time difference, and the first calculated time difference;
if there is such variation, signalling a potential engine malfunction.

An embodiment of the method comprises:
detecting if there is a positive variation of time between the calculated differences higher than 50% between: one of said calculated time differences and any other calculated time difference;
if there is such variation, signalling a potential engine malfunction of a cylinder without compression.

An embodiment of the method comprises:
  detecting if there is a negative variation of time between the calculated differences higher than 10% between: one of said calculated time differences and any other calculated time difference;
  if there is such variation, signalling a potential engine malfunction of a cylinder with a compression fault.

An embodiment of the method comprises:
  detecting if there is a variation of time between the calculated differences higher than 10% between any said calculated time difference and the average of the other calculated time differences;
  if there is such variation, signalling a potential engine malfunction.

In an embodiment, the engine is an engine that needs to rotate, at least, two crankshaft revolutions, this being at least one engine cycle, to initiate operation of the engine.

An embodiment of the method comprises:
  counting the number of consecutive local minimums in the captured signal for indication of the cylinder where the potential engine malfunction is signalled.

An embodiment of the method comprises applying a high-pass filter to the captured signal in order to remove DC-component and battery voltage signal fluctuations other than starter motor fluctuations.

An embodiment of the method comprises:
  detect if signal a potential engine malfunction has been detected twice in consecutive engine cycles coinciding in the same cylinder;
  if there is such coinciding, signal an enhanced potential engine malfunction.

It is also disclosed a non-transitory storage media including program instructions for implementing a Method for evaluating the compression of the cylinders of an internal-combustion engine of a vehicle having an electric starter motor and respective starting battery, the program instructions including instructions executable to carry out the method of any of the embodiments.

It is also disclosed a device for evaluating the compression of the cylinders of an internal-combustion engine of a vehicle, comprising an electronic data processor arranged to carry out the method of any of the embodiments.

It is also disclosed a device for evaluating the compression of the cylinders of an internal-combustion engine of a vehicle, according to the disclosed embodiments, comprising said non-transitory storage media.

In an embodiment, the device is arranged to be mounted in said vehicle.

An embodiment comprises a vehicle battery connection interface or a CAN-bus connection interface.

BRIEF DESCRIPTION OF THE DRAWINGS

The following figures provide preferred embodiments for illustrating the disclosure and should not be seen as limiting the scope of invention.

DETAILED DESCRIPTION

Figure 1:
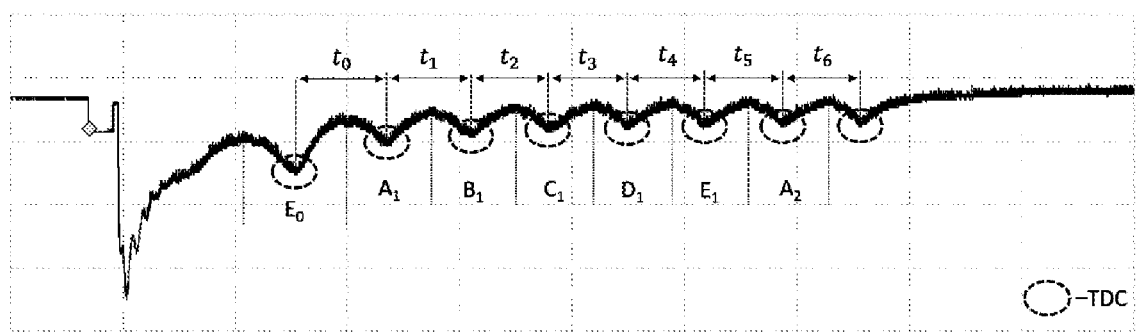
FIG. 1: Schematic representation of an embodiment of a plot of the battery voltage behaviour during cranking in a 5-cylinder engine.

The plot presented in FIG. 1 demonstrates the behaviour of the battery voltage in a 5-cylinder engine of a heavy-duty vehicle. In an embodiment, the segmentations represented in the plot by $E_0$, $A_1$, $B_1$, $C_1$, $D_1$, $E_1$ and $A_2$ correspond to the compression of the several cylinders of the engine, whose firing order is not relevant for the analysis.

In an embodiment, the different local minimums marked in FIG. 1 represent the TDC of the engine. The time elapsed between the several TDC, represented in the plot by $t_0$, $t_1$, $t_2$, $t_3$, $t_4$, $t_5$, $t_6$, will indicate the state of compression in the cylinders. In the demonstrated case, the engine has a good state of health, does not exist a major difference between the elapsed times. A difference of time higher than 10% between the TDCs is indicative of a compression fault in the engine.

In the plot of FIG. 1, the first compression, identified by $E_0$, can be ignored from the analysis because the engine performed more than a complete cycle. Is preferred to use the last compressions due to the engine's speed being more stabilized. When is necessary to introduce the first compression, the period to could be greater than the other periods albeit not revealing a problem.

In an embodiment, the battery voltage during the crank was acquired in some several light-duty vehicles with a 4-cylinder engine. From the performed tests, it was possible to identify that the engines have different states of health relative to the compression ratio of the cylinders.

In an embodiment, the first test was performed on a vehicle whose engine had a cylinder without any compression, completely dead.

Figure 2:
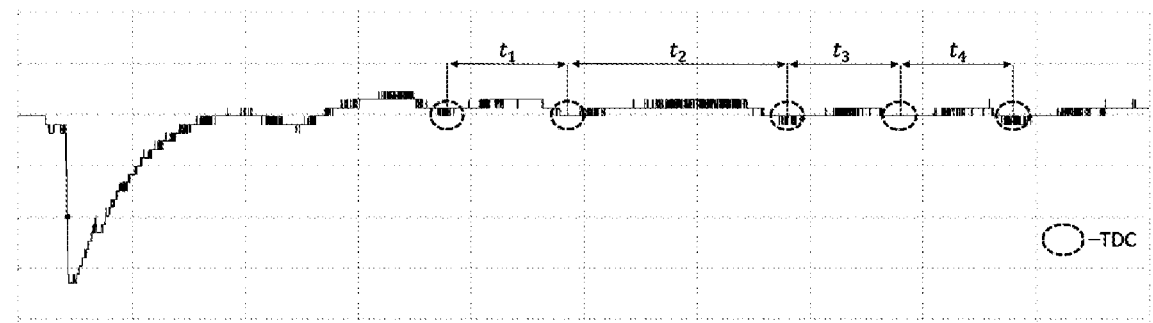
FIG. 2: Schematic representation of an embodiment of a plot of a battery voltage behaviour during cranking in a 4-cylinder engine with a faulty cylinder.

In FIG. 2, after identifying the TDCs in the battery voltage plot by detecting the local minimum, it is possible to calculate the elapsed time between them. The calculated values are presented in Table 1.

TABLE 1

| Elapsed time and difference between TDCs in a faulty engine (dead cylinder). | | |
| --- | --- | --- |
| | Elapsed time [ms] | Difference [%] |
| $t_1$ | 120 | — |
| $t_2$ | 212 | 76.6 |
| $t_3$ | 114 | 5 |
| $t_4$ | 112 | 6.6 |

In an embodiment, taking the value of $t_1$ as a reference, the time differences were calculated. The time difference calculated to $t_2$ is greater than the maximum limit defined as admissible (10%). It is noticeable that there is a serious problem in one cylinder.

In this situation, since there is a cylinder without compression, the time $t_2$ has almost the double duration of the remaining ones. It does not have exactly the double of the duration, as expected, because as the cylinder has no compression, it does not offer any resistance torque to the starter motor, increasing the engine speed.

Figure 3:
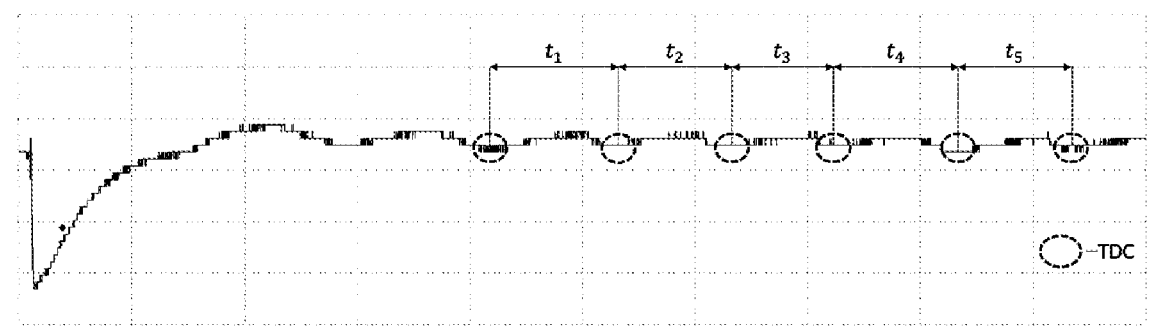
FIG. 3: Schematic representation of an embodiment of a plot of a battery voltage during cranking in a 4-cylinder engine with compression leak in a cylinder.

In an embodiment, the following analysis was performed on an engine where there is a cylinder with a compression leak. The battery voltage behaviour during the cranking is shown in FIG. 3.

In an embodiment, after identifying the TDCs in the battery voltage plot by detecting the local minimum, it is possible to calculate the elapsed time between them. The calculated values are presented in Table 2.

TABLE 2

Elapsed time and difference between TDCs in an engine with compression leak.

|  | Elapsed time [ms] | Difference [%] |
|---|---|---|
| $t_1$ | 127 | — |
| $t_2$ | 118 | 7 |
| $t_3$ | 105 | 17.3 |
| $t_4$ | 128 | 0.8 |
| $t_5$ | 123 | 3.2 |

In an embodiment, the time difference found in $t_3$ is greater than the maximum limit defined as admissible indicating there is a problem in one cylinder. In this engine as there is only a slight compression leak, contrasting the previously situation, the time elapsed is lower than the others. This is due to the torque resistance given to the starter motor be lower and reach the TDC sooner.

Figure 4:
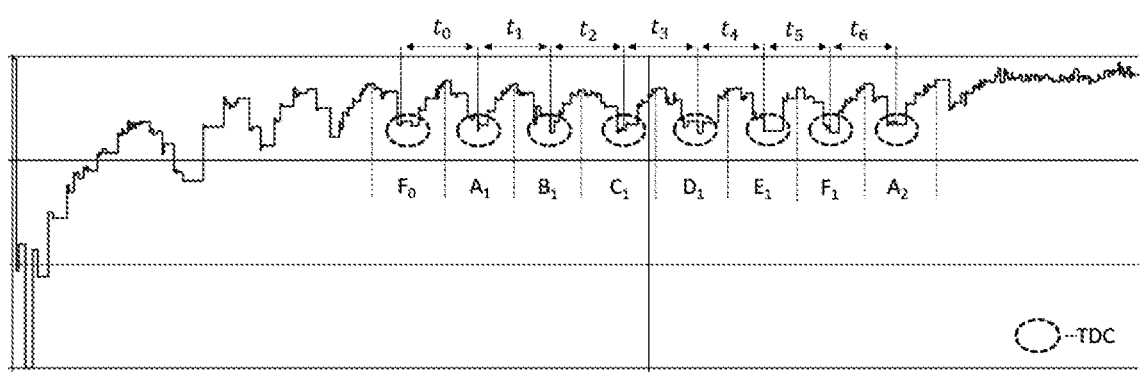
FIG. 4: Schematic representation of an embodiment of a plot of the battery voltage behaviour during cranking in a 6-cylinder engine.

In an embodiment, the following analysis was performed on a 6-cylinder engine in good working condition. The battery voltage behaviour during cranking is shown in FIG. 4.

In an embodiment, after identifying the TDCs in the battery voltage plot by detecting the local minimum, it is possible to calculate the elapsed time between them. The calculated values are presented in Table 3.

TABLE 3

Elapsed time and difference between TDCs in an engine in good working conditions

|  | Elapsed time [ms] | Difference [%] |
|---|---|---|
| $t_1$ | 111 | — |
| $t_2$ | 108 | 1.8 |
| $t_3$ | 116 | 4.5 |
| $t_4$ | 110 | 0.9 |
| $t_5$ | 105 | 5.4 |
| $t_6$ | 106 | 4.5 |

In an embodiment, the time elapsed between the several TDC is similar—the difference is lower than 10%. This is indicative the cylinders are running equally.

The analysis previously presented can be automatically processed by machine learning algorithms, creating a profile and history for the vehicle about the battery voltage behaviour during the cranking. When the current analysis of the battery's voltage behaviour presents a deviation comparatively to vehicle's historical data, the user is notified to carry out more conclusive tests.

In an embodiment, analyzing the data obtained through the presented method was observed that a difference of 5% between cylinders does not represent a problem in the engine, it can be generated by small wear in the cylinders and on piston rings. However, if the difference exceeds 10% may compromise the burning efficiency resulting in power loss, an increase in fuel consumption and higher emissions level.

The method disclosed is able to sort the compression problems of potentially all internal combustion engines and determines which vehicles need intervention so that the customer can then, and only when required, proceed with more complete and intrusive diagnoses that require vehicle downtime. This predictive sorting reduces the vehicle downtime, which represents a key indicator for the automotive and transport industries and focus the maintenance teams on the vehicles that need to be serviced instead of using unnecessary time and resources monitoring engines that do not have compression-related issues. The disclosed approach fills the gap between preventive and predictive monitoring.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A method for evaluating the compression of the cylinders of an internal-combustion engine of a vehicle having an electric starter motor and respective starting battery, comprising:

start capturing the battery voltage signal when the starter motor stars to rotate the internal- combustion engine so as to initiate operation of the engine under its own power;

cease capturing the battery voltage signal when the engine enters operation under its own power;

processing the captured voltage signal for the location of local minimums;

calculating the time difference between consecutive local minimums;

detecting if there is a variation of time between the calculated differences that is higher than a predetermined threshold between any said calculated time differences; and if there is such variation, signaling a potential engine malfunction, wherein the predetermined threshold is 10%.

2. The method for evaluating the compression of the cylinders according to claim 1, further comprising:
   detecting if there is a variation of time between the calculated differences higher than 10% between: any said calculated time difference other than the first calculated time difference and the first calculated time difference; and
   if there is such variation, signalling a potential engine malfunction.

3. The method for evaluating the compression of the cylinders according to claim 1, further comprising:
   detecting if there is a positive variation of time between the calculated differences higher than 50% between: one of said calculated time differences and any other calculated time difference; and
   if there is such variation, signaling a potential engine malfunction of a cylinder without compression.

4. The method for evaluating the compression of the cylinders according to claim 1, further comprising:
   detecting if there is a negative variation of time between the calculated differences higher than 10% between: one of said calculated time differences and any other calculated time difference;
   if there is such variation, signaling a potential engine malfunction of a cylinder with a compression fault.

5. The method for evaluating the compression of the cylinders according to claim 1, further comprising:
   detecting if there is a variation of time between the calculated differences higher than 10% between any said calculated time difference and the average of the other calculated time differences;
   if there is such variation, signaling a potential engine malfunction.

6. The method for evaluating the compression of the cylinders according to claim 1, wherein the engine is an engine that needs to rotate at least two crankshaft revolutions comprising at least one engine cycle to initiate operation of the engine.

7. The method for evaluating the compression of the cylinders according to claim 1, further comprising:
   counting the number of consecutive local minimums in the captured signal for indication of the cylinder where the potential engine malfunction is signalled.

8. The method for evaluating the compression of the cylinders according to claim 1, further comprising applying a high-pass filter to the captured signal in order to remove DC-component and battery voltage signal fluctuations other than starter motor fluctuations.

9. The method for evaluating the compression of the cylinders according to claim 1, further comprising:
   detecting if signal a potential engine malfunction has been detected twice in consecutive engine cycles coinciding in the same cylinder;
   if there is such coinciding, signaling an enhanced potential engine malfunction.

10. A non-transitory storage media including program instructions for implementing a method for evaluating compression of cylinders of an internal-combustion engine of a vehicle having an electric starter motor and respective starting battery, the program instructions including instructions executable to carry out the steps of:
    start capturing the battery voltage signal when the starter motor stars to rotate the internal- combustion engine so as to initiate operation of the engine under its own power;
    cease capturing the battery voltage signal when the engine enters operation under its own power;
    processing the captured voltage signal for the location of local minimums;
    calculating the time difference between consecutive local minimums;
    detecting if there is a variation of time between the calculated differences that is higher than a predetermined threshold between any said calculated time differences; and
    if there is such variation, signaling a potential engine malfunction,
    wherein the predetermined threshold is 10%.

11. A device for evaluating compression of cylinders of an internal-combustion engine of a vehicle, comprising an electronic data processor arranged to carry out the steps of:
    start capturing the battery voltage signal when the starter motor stars to rotate the internal-combustion engine so as to initiate operation of the engine under its own power;
    cease capturing the battery voltage signal when the engine enters operation under its own power;
    processing the captured voltage signal for the location of local minimums;
    calculating the time difference between consecutive local minimums;
    detecting if there is a variation of time between the calculated differences that is higher than a predetermined threshold between any said calculated time differences; and
    if there is such variation, signaling a potential engine malfunction,
    wherein the predetermined threshold is 10%.

12. The device of claim 11, further comprising a non-transitory storage media including program instructions configured to implement each of the recited steps.

13. The device of claim 11, wherein the device is arranged to be mounted in the vehicle.

14. The device of claim 13, further comprising a vehicle battery connection interface or a CAN-bus connection interface.

* * * * *